(12) United States Patent
Wozniak et al.

(10) Patent No.: US 11,727,252 B2
(45) Date of Patent: Aug. 15, 2023

(54) ADAPTIVE NEUROMORPHIC NEURON APPARATUS FOR ARTIFICIAL NEURAL NETWORKS

(71) Applicant: INTERNATIONAL BUSINESS MACHINES CORPORATION, Armonk, NY (US)

(72) Inventors: Stanislaw Andrzej Wozniak, Kilchberg (CH); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 16/556,706

(22) Filed: Aug. 30, 2019

(65) Prior Publication Data
US 2021/0064973 A1    Mar. 4, 2021

(51) Int. Cl.
*G06N 3/063*    (2023.01)
*G06N 3/084*    (2023.01)

(52) U.S. Cl.
CPC ............. *G06N 3/063* (2013.01); *G06N 3/084* (2013.01)

(58) Field of Classification Search
CPC .............................. G06N 3/063; G06N 3/084
See application file for complete search history.

(56) References Cited

U.S. PATENT DOCUMENTS 9,367,798 B2    6/2016   Coenen
11,526,735 B2   12/2022  Wozniak
2011/0004579 A1  1/2011  Snider
2015/0106311 A1  4/2015  Birdwell
2015/0106314 A1  4/2015  Birdwell
2015/0106315 A1  4/2015  Birdwell
2015/0286925 A1  10/2015 Levin
2016/0042271 A1* 2/2016  Yoon .................. G06N 3/04
                                                706/25

(Continued)

OTHER PUBLICATIONS

Al-Shedivat, et al., "Memristors Empower Spiking Neurons With Stochasticity", IEEE Journal On Emerging and Selected Topics in Circuits and Systems, vol. 5, No. 2, Jun. 2015, pp. 242-253.

(Continued)

*Primary Examiner* — Li B. Zhen
*Assistant Examiner* — Moriam Mosunmola Godo
(74) *Attorney, Agent, or Firm* — Caleb D. Wilkes

(57) ABSTRACT

The present disclosure relates to a neuromorphic neuron apparatus comprising an output generation block and at least one adaptation block. The apparatus has a current adaptation state variable corresponding to previously generated one or more signals. The output generation block is configured to use an activation function for generating a current output value based on the current adaptation state variable. The adaptation block is configured to repeatedly: compute an adaptation value of its current adaptation state variable using the current output value and a correction function; use the adaption value to update the current adaptation state variable to obtain an updated adaptation state variable, the updated adaptation state variable becoming the current adaptation state variable; receive a current signal; and cause the output generation block to generate a current output value based on the current adaptation state variable and input value that obtained from the received signal.

20 Claims, 4 Drawing Sheets

(56) References Cited

U.S. PATENT DOCUMENTS

| | | | |
|---|---|---|---|
| 2016/0275395 A1* | 9/2016 | Amir | G06N 3/105 |
| 2017/0024661 A1 | 1/2017 | Hunsberger | |
| 2018/0082176 A1 | 3/2018 | Wu | |
| 2018/0174026 A1* | 6/2018 | Davies | G06N 3/063 |
| 2018/0174027 A1* | 6/2018 | Davies | G06N 3/049 |
| 2018/0174028 A1 | 6/2018 | Lin | |
| 2018/0174040 A1 | 6/2018 | Davies | |
| 2018/0232631 A1 | 8/2018 | Appuswamy | |
| 2019/0122110 A1* | 4/2019 | Ruckauer | G06N 3/049 |

OTHER PUBLICATIONS

D. Huh, et al., "Gradient descent for spiking neural networks," arXiv:1706.04698v2 [q-bio.NC], Jun. 19, 2017, pp. 1-10.

Damien Querlioz, et al. "Simulation of a Memristor-Based Spiking Neural Network Immune to Device Variations," Proceedings of International Joint Conference on Neural Networks, IEEE, San Jose, CA, Jul. 31-Aug. 5, 2011, pp. 1775-1781.

David E. Rumelhart, et al., "Learning Internal Representations by Error Propagation," DTIC Document, ICS report 8506, Sep. 1985, pp. 1-49.

David Zambrano, et al., "Sparse Computation in Adaptive Spiking Neural Networks," Frontiers in Neuroscience, Jan. 2019, vol. 12, Article 987, pp. 1-11.

Dharmendra S. Modha, et al., "Cognitive Computing," Communications of the ACM, vol. 54 Issue 8, Aug. 2011, pp. 62-71.

Duygu Kuzum, et al., "Synaptic electronics: materials, devices and applications," Nanotechnology, vol. 24, 382001, 2013, pp. 1-23.

Guillaume Bellec, et al., "Long short-term memory and learning-to-learn in networks of spiking neurons," 32nd Conference on Neural Information Processing Systems (NeurIPS 2018), Montreal, Canada, arXiv:1803.09574v4 [cs.NE], Dec. 25, 2018, pp. 1-19.

J. H. Lee, et al., "Training Deep Spiking Neural Networks Using Backpropagation," Frontiers in Neuroscience, vol. 10, Article 508, Nov. 2016, pp. 1-13.

Matthieu Courbariaux, et al., "BinaryConnect: Training Deep Neural Networks with binary weights during propagations," https://github.com/MatthieuCourbariaux/BinaryConnect, pp. 1-9.

P. Földiák, "Forming sparse representations by local anti-Hebbian learning," Biol. Cybern., 64, pp. 165-170, 1990.

Pantazi, et al., "All-memristive neuromorphic computing with level-tuned neurons," Nanotechnology, vol. 27, 2016, 355205, pp. 1-14.

Paul. J. Werbos, "Generalization of Backpropagation with Application to a Recurrent Gas Market Model," Neural Networks, vol. 1, No. 4, pp. 339-356, 1988.

S. Hochreiter et al., "Long Short-Term Memory," Neural Computation, vol. 9, No. 8, pp. 1735-1780, 1997.

Stanislaw Wozniak et al., "Feed-forward deep networks incorporating spiking neuron dynamics outperform recurrent artificial networks on temporal tasks", IBM Research—Zurich, 8803 Ruschlikon, Switzerland, Dated: Nov. 6, 2018, pp. 1-9.

Stanislaw Wozniak et al., "Learning Spatio-Temporal Patterns in the Presence of Input Noise using Phase-Change Memristors," 2016 IEEE International Symposium on Circuits and Systems (ISCAS), pp. 365-368.

Stanislaw Wozniak, et al. "Deep Networks Incorporating Sp, king Neural Dynamics," IBM Research—Zurich, 3803 Ruschlikon, Switzerland, arXiv:1812.07040v1 [cs.NE], Dec. 17, 2018, pp. 1-9.

Steven K. Esser et al., "Convolutional networks for fast, energy-efficient neuromorphic computing," Proceedings of the National Academy of Sciences, Brain-Inspired Computing, IBM Research-Almaden, San Jose, CA, Aug. 2016, pp. 1-6.

Tomas Tuma, et al., "Stochastic phase-change neurons," Nat Nano, vol. 11, No. 8, Aug. 2016, pp. 1-8.

Yoshua Bengio, et al., "Estimating or Propagating Gradients Through Stochastic Neurons for Conditional Computation," arXiv:1308.3432v1 [cs.LG], Aug. 15, 2013, pp. 1-12.

Henry Martin, "Spiking Neural Networks For Vision Tasks", Dec. 15, 2015, pp. 1-21. (Year: 2015).

IBM, List of IBM Patents or Patent Applications Treated as Related, Appendix P, filed herewith, 2 pages.

Jeong et al., "Memristor Devices for Neural Networks", Oct. 30, 2018, Journal of Physics D: Applied Physics, pp. 1-28 (Year: 2018).

Indiveri et al., "Neuromorphic Silicon Neuron Circuits", May 2011, vol. 5 Article 73, pp. 1-23 (Year: 2011).

Merchant, "Intrinsically Evolvable Artificial Neural Networks", Aug. 2007, pp. 1-219 (Year: 2007).

* cited by examiner

ADAPTIVE NEUROMORPHIC NEURON APPARATUS FOR ARTIFICIAL NEURAL NETWORKS

BACKGROUND

The present invention relates to the field of computer systems, and more specifically, to an adaptive neuromorphic neuron apparatus for artificial neural networks.

Neural networks are a computational model used in artificial intelligence systems. Neural networks are based on multiple artificial neurons. Each artificial neuron is connected with one or more other neurons, and links can enhance or inhibit the activation state of adjoining neurons. Artificial neurons such as neurons of a spiking neural network (SNN) are provided with a firing threshold that must be exceeded by a membrane potential of the neurons in order to generate a spike.

SUMMARY

Various embodiments provide a neuromorphic neuron apparatus, computer program product, and method as described by the subject matter of the independent claims. Advantageous embodiments are described in the dependent claims. Embodiments of the present invention can be freely combined with each other if they are not mutually exclusive.

In one aspect, the invention relates to a neuromorphic neuron apparatus comprising an output generation block and a first adaptation block, the apparatus having a current adaptation state variable corresponding to previously generated one or more signals, the output generation block being configured to use an activation function for generating a current output value based on the current adaptation state variable. The first adaptation block is configured to repeatedly a) compute an adaptation value of its current adaptation state variable using the current output value and a correction function indicative of a decay behavior of a time constant of the first adaptation block;

b) using the adaptation value to update the current adaptation state variable, the updated adaptation state variable becoming the current adaptation state variable (the updated adaptation state variable being the adaptation value);

c) receive a current signal; and d) cause the output generation block to generate a current output value based on the current adaptation state variable and input value that is obtained from the received signal.

In another aspect, the invention relates to an artificial neural network comprising multiple layers, wherein at least one layer of the multiple layers comprises one or more neuromorphic neuron apparatus according to the preceding embodiment. The artificial neural network may, for example, be a SNN.

In another aspect, the invention relates to a method for a neuromorphic neuron apparatus comprising an adaptation block and an output generation block, the apparatus having a current state variable corresponding to previously received one or more signals, and a current output value based on the current state variable; the method comprising repeatedly a) computing an adaptation value of its current adaptation state variable using the current output value and a correction function indicative of a decay behavior of a time constant of the first adaptation block;

b) using the adaptation value to update the current adaptation state variable, the updated adaptation state variable becoming the current adaptation state variable;

c) receiving a current signal; and d) causing the output generation block to generate a current output value based on the current adaptation state variable and an input value that is obtained from the received signal.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
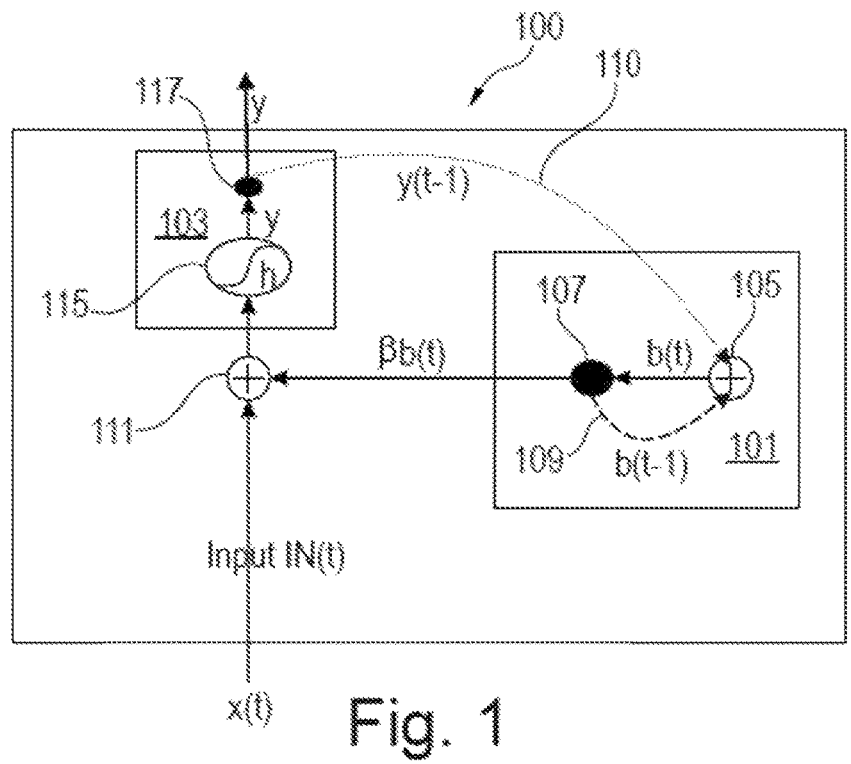
FIG. 1 illustrates a neuromorphic neuron apparatus according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present apparatus may maintain or memorize a temporal context of the apparatus using different state variables. This may enable the apparatus to recognize patterns across time. For example, the present apparatus may use two state variables, where the output value of the apparatus may be a state variable value. The state variables may be maintained by, for example, exchanging them through recurrent connections of the apparatus or by using other means such as memories. Memories may be memristive devices, e.g., phase-change memory or other memory technologies. In the case of memristive devices, a state variable value may be represented in the device conductance.

Using different state variables may enable to process accurately the received signals at the apparatus. In addition, the present apparatus may enable a controlled processing of the received signals. For example, complex relations between input signals and output signals may be implemented using the different state variables.

An accurate and controlled processing of the received signals may improve the overall accuracy and performance of artificial neural networks using the present apparatus. In particular, the present subject matter may enable an accurate and efficient processing of temporal data. For example, streams of temporal data may directly be feed into the apparatus and processed by the apparatus. This may render the present apparatus applicable to tasks such as unsegmented, connected handwriting recognition or speech recognition.

The present subject matter may provide an apparatus that makes the SNN dynamics easy to implement and to train. In particular, the present apparatus may enable a fast and simple training of SNNs that are built out of the present apparatus. This could increase the usage of the SNNs for practical applications and make use of many power-efficient neuromorphic SNN chips.

For example, the output generation block may have a time dependent output $y(t)$ which may be a state variable of the output generation block. The adaptation state variable $b(t)$ may for example be defined as $b(t)=\rho(\tau)b(t-1)+(1-\rho(\tau))y(t-1)$, where $y(t-1)$ is the output of the output generation block that corresponds to a previous signal at time $t-1$, and $\rho(\tau)$ is the correction function indicative of the decay behavior of a time constant of the first adaptation block. $b(t)$ as defined above may be obtained by applying an adaptation value to the previous adaptation state variable $b(t-1)$. The adaptation value is described by $\rho(\tau)$, $y(t-1)$ and $b(t-1)$. For example, $y(t-1)$ may be the last output of the output generation block before executing step a) in a current iteration. The output value may be defined as follows $y(t)=h(IN(t)+\beta b(t)+b_0)$, where $IN(t)$ is the input value. In one example, the input value is the value of the received signal. $\beta$ and $b_0$ are constant scaling values, and h is an activation function.

According to one embodiment, the apparatus further comprises an accumulation block having a current accumulation state variable, wherein the accumulation block is configured in each iteration: to perform in step a) computing an adjustment of the current accumulation state variable using the current output value and a correction function indicative of a decay behavior of the time constant of the accumulation block; and to perform in step c) upon receiving the current signal and before step d) an update of the current accumulation state variable using the computed adjustment and the received signal, the updated accumulation state variable becoming the current accumulation state variable, the input value being a value of the current accumulation state variable.

The apparatus of this embodiment may further improve the performance of the apparatus as it introduces a third state variable $s(t)$ that is obtained by a preprocessing of the received signals. The third state variable may be defined as follows: $s(t)=g(x(t)+s(t-1)(1-y(t-1)))$, where $x(t)$ is the received signal in step c) of the current iteration and g is an activation function of the accumulation block. In this embodiment, $IN(t)=s(t)$.

According to one embodiment, the apparatus further comprises a second adaptation block, wherein in each iteration: the second adaptation block being configured to compute in step a) a current weight value of its current state variable using the current output value and a correction function indicative of a decay behavior of the time constant of the second adaptation block, and to weight, before receiving a new current signal, the received signal and the current accumulation state variable by the current weight value, the weighted received signal becoming the current signal and the weighted current state variable becoming the current accumulation state variable. The current weight value may be a current state variable of the second adaptation block.

The second adaptation block may enable to better control the values of the accumulation state variable $s(t)$ and the received signal $x(t)$ before being used at the output generation block. The state variable $z(t)$ of the second adaptation block may be defined as follows: $z(t)=k(r(t)+b_r)$, where $r(t)=\rho(\tau)r(t-1)+(1-\rho(\tau))y(t-1)$ and k is an activation function of the second adaptation block. The weight value may be defined as: $1-z(t)$ and the accumulation state variable may be defined as: $s(t)=g(x(t)(1-z(t))+s(t-1)(1-z(t)))$. In this embodiment, $IN(t)=s(t)$. The correction function $\rho(\tau)$ of the first adaptation block and the correction function $\rho(\tau)$ of the second adaptation block may or may not be the same.

According to one embodiment, the apparatus further comprises a second adaptation block, the second adaptation block being configured in each iteration: to compute in step a) a current weight value of its current state variable using the current output value and a correction function indicative of a decay behavior of the time constant of the second adaptation block; and to weight, before receiving a new current signal, the received signal by the current weight value, the weighted received signal becoming the current signal. In this case $IN(t)=s(t)=g(x(t)z(t)+s(t-1)(1-y(t-1)))$, where $z(t)=k(r(t)+b_r)$ and k is an activation function of the second adaptation block. The current weight value may be a current state variable of the second adaptation block.

According to one embodiment, the accumulation block is configured to perform the updating using an activation function different from the activation function of the output generation block.

According to one embodiment, the second adaptation block is configured to compute the current weight value using an activation function which is the same activation function of the output generation block.

According to one embodiment, the second adaptation block is configured to compute the weight value using an activation function different from the activation function of the output generation block.

Using the same or different activation functions in the different blocks of the apparatus may increase the implementation flexibility of the present subject matter in order to learn complex functional mappings from data. It may further increase the control aspect of the present subject matter.

According to one embodiment, the accumulation block is configured to receive from the output generation block a reset signal indicative of the current output value used for the computing of the adjustment.

According to one embodiment, the output generation block is configured to automatically provide to the accumulation block a reset signal indicative of the current output value used for the computing of the adjustment upon generating the current output value.

According to one embodiment, the output generation block is configured to provide a reset signal indicative of the current output value used for the computing of the adjustment via a reset gate connecting the accumulation block and the output generation block. For example, an activation of the output generation block may control the resetting of the state variable by gating a self-looping connection at the accumulation block.

According to one embodiment, the accumulation block comprises an adder circuit, multiplication circuit and activation circuit, the multiplication circuit being configured to compute the adjustment, the adder circuit being configured to add the adjusted state variable to the received signal, the activation circuit being configured to perform the update using the result of the addition and to provide the updated accumulation state variable to the output generation block.

According to one embodiment, the second adaptation block comprises an adder circuit, and activation circuit, the adder circuit being configured to add the current output value to the current adaptation state variable value of the second adaptation block, the activation circuit being configured to perform the computation of the current weight value using the result of the addition.

According to one embodiment, the activation function of the output generation block is a step function.

According to one embodiment, the activation function of the output generation block is a sigmoid function or another activation function that is configured to generate an output value of the apparatus.

According to one embodiment, the accumulation block is configured to perform the updating using an activation function, the activation function being a rectified linear activation function or another activation function that is configured to perform the update by the accumulation block.

FIG. 1 illustrates a neuromorphic neuron apparatus 100 in accordance with an example of the present subject matter. The neuromorphic neuron apparatus 100 may be implemented using a neuromorphic hardware implementation. For example, the neuromorphic neuron apparatus may be a circuit using memristors to implement at least part of the present subject matter. The neuromorphic neuron apparatus 100 may alternatively be implemented by using analog or digital CMOS circuits.

The neuromorphic neuron apparatus 100 may be configured to receive a stream of signals (or time series) x(t−n) . . . x(t−3), x(t−2), x(t−1), x(t): For example, each of the signals x(t−n) . . . x(t) may be indicative of a respective image that has been acquired at respective time t−n, . . . t. A received signal x(t) of the stream may be a variable value. The variable value may be a combination of one or more input values. The combination of the input values may be a weighted sum of the input values. The weighted sum uses synaptic weights of respective input values. Each input value may be received at the neuromorphic neuron apparatus 100 via a synapse that weights the input value. In one example, the input value may be received from a single synapse. In another example, the input value may be the combination of multiple input values of different synapses e.g. the received signal may be $x(t)=W(x1)*x1+W(x2)*x2+ \ldots W(xn)*xn$, where x1 to xn are the input values and W(xi) are the synaptic weights. For example, the input values may be values indicative of a content of pixels of an image and the variable value may be indicative of one or more properties of the image.

The neuromorphic neuron apparatus 100 may be configured to process the received variable value. The neuromorphic neuron apparatus 100 may generate an output value based on the received variable value. In one example, the neuromorphic neuron apparatus 100 may be configured to generate spikes to encode values of a variable at each time instant in the generated spikes e.g. the neuromorphic neuron apparatus 100 may generate spikes for a scalar variable such as the gray-scale color of a pixel. The neuromorphic neuron apparatus 100 may, for example, be configured to perform a rate-based coding. The rate coding encodes information in the rate of the generation of spikes such that the firing rate is the basis of information. The output spiking rate of the neuromorphic neuron apparatus 100 may for example be analyzed or determined over a range of time. This may for example be done by analyzing a sequence of outputs such as sequence y(t−2), y(t−1) and y(t) generated for respective received signals x(t−2), x(t−1) and x(t) of a time period (t−2, t).

Furthermore, the neuromorphic neuron apparatus 100 may be configured to perform a timing-based coding. The timing-based coding encodes information in the timing of the spikes such that the exact spike timing is the basis of information.

For processing the received variable value and generating an output value based on the received variable value, the neuromorphic neuron apparatus 100 may be provided, in accordance with the present subject matter with multiple state variables. For providing multiple state variables, at least two distinct blocks may be used to generate the respective state variables. The process of generating the output value may be split between or collaboratively be performed by the two blocks. Providing multiple blocks may enable an accurate and focused control of the process of generating the output values. For example, each of the blocks of the neuromorphic neuron apparatus 100 may be associated with a time dependent state that indicates or represents the output of the block for a given received signal. The neuromorphic neuron apparatus 100 may be configured to memorize states defined for previous received signals and feed them back in the neuromorphic neuron apparatus 100 for defining a current state for a current received signal. This may, for example, be implemented using recurrent connections or memories.

In one example, the neuromorphic neuron apparatus 100 may comprise a first adaptation block 101 and an output generation block 103. In order to generate an output value in accordance with the present subject matter, the neuromorphic neuron apparatus 100 involves a time dependent adaptation state variable b(t) that may be used to define the output value y(t).

For example, for each received signal x(t), a respective adaptation state variable b(t) may be computed by the first adaptation block 101. The first adaptation block 101 may be configured to output at branching point 107, the computed state variable b(t). The first adaptation block 101 may for example comprise an adder circuit 105. The connection 109 between the branching point 107 and the adder circuit 105 is shown as a dashed line to indicate that the connection 109 is with a time-lag. That is, at the time the neuromorphic neuron apparatus 100 is processing a received signal x(t) to generate corresponding b(t) and y(t), the connection 109 may transmit a value of a previous adaptation state variable b(t−1) that can be used to compute b(t).

The connection 110 is shown as a dashed line to indicate that the connection 110 is with a time-lag. That is, at the time the neuromorphic neuron apparatus 100 is processing a received signal x(t) to generate corresponding b(t) and y(t), the connection 110 may transmit a previous output value y(t−1). The connections 109 and 110 may enable a feedback capability to the neuromorphic neuron apparatus 100. In particular, the connection 109 may be a self-looping connection within the first adaptation block 101.

The output value y(t−1) and the adaptation state variable b(t−1) of a previous iteration may be fed to the adder circuit 105. The adder circuit 105 may be configured to receive the output value y(t−1) from the output generation block 103 and the adaptation state variable b(t−1). The adder circuit 105 may further be configured to perform the sum of the output value y(t−1) and the adaptation state variable b(t−1) as follows: $\rho(\tau)b(t-1)+(1-\rho(\tau))y(t-1)$, where $\rho(\tau)$ is the correction function indicative of the decay behavior of a time constant of the first adaptation block. The received signal x(t) may induce a current into the neuromorphic neuron apparatus 100. The adaptation state variable b(t) may decay or fall depending on the time constant of the neuromorphic neuron apparatus 100. This decay may for example be taken into account by the first adaptation block 101 for computing the adaptation value using $\rho(\tau)$. The values of $\rho(\tau)$ may for example be stored in a memory (not shown) of the neuromorphic neuron apparatus 100.

This sum is provided or output by the adder circuit 105 so that the first adaptation block 101 may output at branching point 107, the adaptation state variable b(t) which is scaled by a predefined scale factor $\beta$. The scaled adaptation state variable $\beta b(t)$ may be output to another adder circuit 111. The adder circuit 111 is configured to receive the scaled adaptation state variable $\beta b(t)$ and an input value IN(t). In this example, of FIG. 1, the input value IN(t) may be the value of the received signal x(t). The adder circuit 111 may further be configured to perform the sum of the received scaled adaptation state variable $\beta b(t)$ and the signal x(t) as follows $x(t)+\beta b(t)$.

The output generation block 103 may comprise an activation logic 115. The output generation block 103 may be configured to receive the computed sum by the adder circuit 111 from adder circuit 111. In addition, the output generation block 103 may be configured to add a constant value $b_0$ to the sum received from the adder circuit 111 as follows $x(t)+\beta b(t)+b_0$. $b_0$ and $\beta$ may be parameters of the apparatus 100 that may be stored e.g., in memristive devices within the apparatus, or fetched from memory. The activation circuit 115 may receive the computed sum $x(t)+\beta b(t)+b_0$ and generate from the computed sum $x(t)+\beta b(t)+b_0$ an output value y(t) using its activation function as follows $y(t)=h(x(t)+\beta b(t)+b_0)$. The generated output value y(t) may be output to another apparatus and/or may be output for usage for a next received signal x(t+1) at the apparatus. The activation function of the output generation block 103 may for example be a step function or sigmoid function or another activation function that the output generation block can use in accordance with the present subject matter. For example, depending on the activation function, y(t) may be an integer or float value that is within the interval [0, 1]. For example, $y(t)=\text{Step}(x(t)+\beta b(t)+b_0)$, where Step is the step activation function. By receiving the sum computed from the first adaption block's output and the signal x(t), the output generation block is caused to perform the computation of y(t) as described above.

Thus, for each received signal x(t) of the stream x(t−n) . . . x(t−3), x(t−2), x(t−1), x(t), the neuromorphic neuron apparatus 100 may be configured to provide, in accordance with the present subject matter, the adaption state variable b(t) using the first adaptation block 101 and an output value y(t) using the output generation block 103.

For computing the adaptation state variable b(t) by the first adaptation block 101, an initialization of the neuromorphic neuron apparatus 100 may be performed. The initialization may be performed such that before receiving any signal at the neuromorphic neuron apparatus 100, the adaptation state variable b(0) and the output variable y(0) may be initialized to respective predefined values. This may enable an implementation based on feedbacks from previous states of the neuromorphic neuron apparatus 100 as follows. For the very first received signal x(1), initialized values b(t−1)=b(0) and y(t−1)=y(0) may be used to compute the state variable b(1).

The first adaptation block 101 may be configured to compute the adaptation state variable b(t) taking into account a previous value of the adaptation state variable e.g. b(t−1) and a previous output value e.g. y(t−1). The previous values of the adaptation state variable and the output value b(t−1) and y(t−1) may be the values determined by the neuromorphic neuron apparatus 100 for a previously received signal x(t−1) as described herein.

Figure 2:
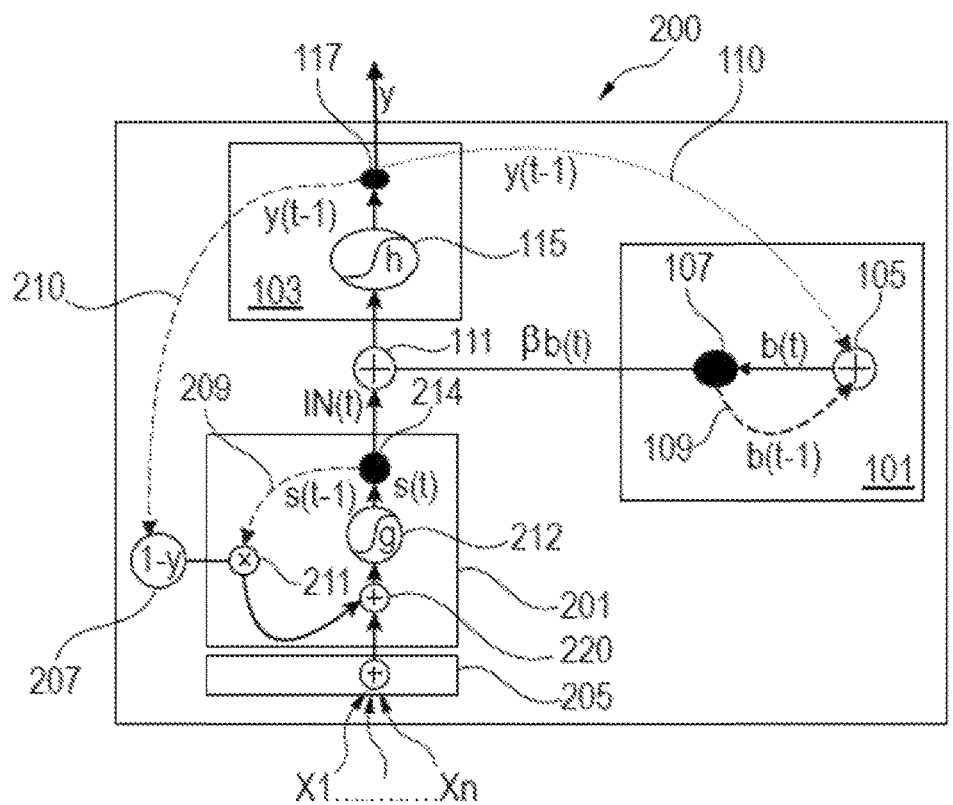
FIG. 2 illustrates a neuromorphic neuron apparatus according to at least one embodiment.

FIG. 2 illustrates an example implementation of a neuromorphic neuron apparatus 200 in accordance with the present subject matter. FIG. 2 shows the status of the neuromorphic neuron apparatus 200 after receiving a signal x(t).

In addition to the components of the apparatus 100 of FIG. 1, the neuromorphic neuron apparatus 200 of FIG. 2 comprises an accumulation block 201 and a summing block 205. In this example of FIG. 2, the adder circuit 111 is configured to receive the scaled adaptation state variable $\beta b(t)$ and an input value IN(t), wherein IN(t) is the state variable s(t) that is output by the accumulation block. The accumulation block 201 may output the state variable s(t) as follows.

The summing block 205 is configured to receive weighted input values W(x1)*x1, W(x2)*x2 . . . W(xn)*xn representative of an object at time t (e.g. an image). The summing block 205 may be configured to perform the sum of the received weighted values $x(t)=W(x1)*x1+W(x2)*x2+\ldots W(xn)*xn$, and the resulting variable value x(t) is provided or output by the summing block 205 to the accumulation block 201.

The accumulation block 201 comprises an adder circuit 220, multiplication circuit 211, and activation circuit 212. The multiplication circuit 211 may for example be a reset gate. The accumulation block 201 may be configured to output at the branching point 214, the computed state variable in parallel to the output generation block 103 and to the multiplication logic 211. The connection 209 between the branching point 214 and the multiplication logic 211 is shown as a dashed line to indicate that the connection 209 is with a time-lag. That is, at the time the neuromorphic neuron apparatus 200 is processing a received signal x(t) to generate corresponding s(t) and y(t), the connection 209 may transmit a value of a previous state variable s(t−1).

The output generation block 103 may comprise an activation logic 115. The output generation block 103 may be configured to receive a state variable from the accumulation block 201. Based on the received state variable, the output generation block 103 may generate and provide or output an output value at a branching point 117 in parallel to another neuron apparatus, and to a reset module 207 of the neuromorphic neuron apparatus 200. The reset module 207 may be configured to generate a reset signal from the received output value and provide the reset signal to the multiplication logic 211. For example, for a given output value y(t−1), the reset module may generate a reset signal indicative of a value 1−y(t−1). The connection 210 is shown as a dashed line to indicate that the connection 210 is with a time-lag. That is, at the time the neuromorphic neuron apparatus 200 is processing a received signal x(t) to generate corresponding s(t) and y(t), the connection 210 may transmit a previous output value y(t−1). The connections 209 and 210 may enable a feedback capability to the neuromorphic neuron apparatus 200. In particular, the connection 209 may be a self-looping connection within the accumulation block and the connection 210 may activate a gating connection for performing the state reset.

Upon receiving the state variable value s(t−1) and the output value y(t−1), the multiplication logic 211 may be configured to compute an adjustment as follows: l(τ)s(t−1)(1−y(t−1)). The adjustment computed by the multiplication circuit 211 is output and fed to the adder circuit 220. The adder circuit 220 may be configured to receive the adjustment from the multiplication circuit 211 and the signal x(t) from the summation block 205. The adder circuit 220 may further be configured to perform the sum of the received adjustment and the signal as follows: x(t)+l(τ)s(t−1)(1−y(t−1)). This sum is provided or output by the adder circuit 220 to the activation circuit 212. The activation circuit 212 may be configured to receive the computed sum from the adder circuit 220. The activation circuit 212 may be configured to apply its activation function on the computed sum in order to compute the state variable s(t) as follows: s(t)=g(x(t)+l(τ)s(t−1)(1−y(t−1))). The resulting state variable s(t) may be output in parallel to the adder circuit 111 of the output generation block 103 and to the multiplication circuit 211 (the outputting to the multiplication circuit 211 may be useful for a next received signal x(t+1)). The activation circuit 115 may be configured to receive the state variable s(t) and to generate from the state variable s(t) an output value y(t) using its activation function. The generated output value may be output to the reset module 207 for usage for a next received signal x(t+1) and/or may be output to another apparatus.

Figure 3:
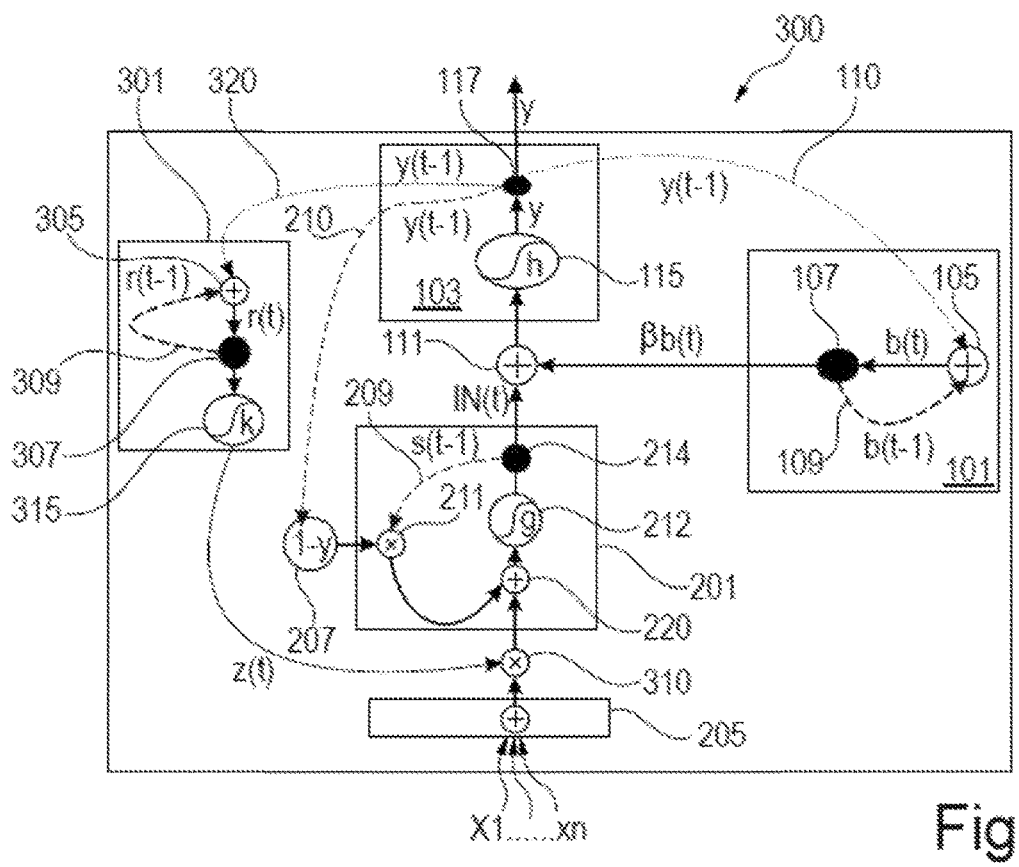
FIG. 3 illustrates a neuromorphic neuron apparatus according to at least one embodiment.

FIG. 3 illustrates an example implementation of a neuromorphic neuron apparatus 300 in accordance with the present subject matter. FIG. 3 shows the status of the neuromorphic neuron apparatus 300 after receiving a signal x(t).

In addition to the components of the apparatus 200 of FIG. 2, the neuromorphic neuron apparatus 300 of FIG. 3 comprises a second adaptation block 301 that is connected to the accumulation block 201 via a multiplication circuit 310. In this example, of FIG. 3, the adder circuit 111 is configured to receive the scaled adaptation state variable βb(t) and an input value IN(t), wherein IN(t) is the state variable s(t) that is output by the accumulation block 201. The input signal x(t) of the apparatus 300 is weighted using the second adaptation block 301. The accumulation block 201 may output the state variable s(t) as follows.

The second adaptation block 301 comprises an adder circuit 305 and activation circuit 315. The second adaptation block 301 may be configured to output at the branching point 307, the computed state variable r(t) to the activation circuit 315. The connection 309 between the branching point 307 and the adder circuit 305 is shown as a dashed line to indicate that the connection 309 is with a time-lag. That is, at the time the neuromorphic neuron apparatus 300 is processing a received signal x(t) to generate corresponding r(t), b(t), s(t) and y(t), the connection 309 may transmit a value of a previous state variable r(t−1).

The connection 320 is shown as a dashed line to indicate that the connection 320 is with a time-lag. That is, at the time the neuromorphic neuron apparatus 300 is processing a received signal x(t) to generate corresponding r(t), b(t), s(t) and y(t), the connection 320 may transmit a previous output value y(t−1).

The output value y(t−1) and the state variable r(t−1) of a previous iteration may be fed to the adder circuit 305. The adder circuit 305 may be configured to receive the output value y(t−1) from the output generation block 103 and the state variable r(t−1). The adder circuit 305 may further be configured to perform the sum of the output value y(t−1) and the state variable r(t−1) and the resulting sum r(t) may be output, where r(t)=ρ(τ) r(t−1)+(1−ρ(τ)) y(t−1) and ρ(τ) is the decay factor calculated from the time constant of the second adaptation block.

The activation circuit 315 may be configured to receive the state variable r(t) and to generate from the state variable r(t) an output value z(t) using its activation function k. The output value z(t) may be provided to the multiplication circuit 310. The multiplication circuit 310 may be configured to receive the output value z(t) and the signal x(t) and to perform the multiplication of x(t) and z(t). This may enable to obtain s(t) of the accumulation block as follows: s(t)=g(x(t)z(t)+l(τ)s(t−1)(1−y(t−1))). Thus, in FIG. 3, the accumulation block 201 may be configured to compute s(t) as described with reference to FIG. 2, but instead of using x(t) as input, z(t)x(t) is used as input to the accumulation block 201.

Figure 4:
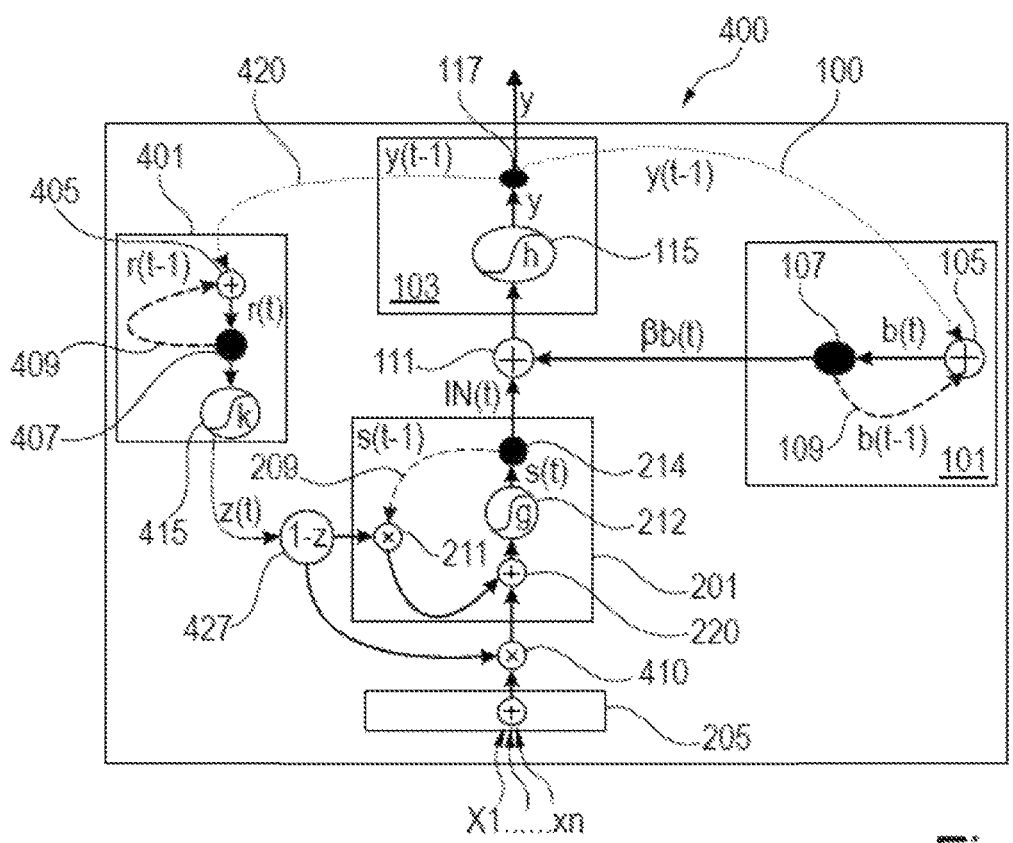
FIG. 4 illustrates a neuromorphic neuron apparatus according to at least one embodiment.

FIG. 4 illustrates an example implementation of a neuromorphic neuron apparatus 400 in accordance with the present subject matter. FIG. 4 shows the status of the neuromorphic neuron apparatus 400 after receiving a signal x(t).

In addition to the components of the apparatus 200 of FIG. 2, the neuromorphic neuron apparatus 400 of FIG. 4 comprises a second adaptation block 401 that is connected to the accumulation block 201 via a multiplication circuit 410 and the multiplication circuit 211.

In this example, of FIG. 4, the adder circuit 111 is configured to receive the scaled adaptation state variable βb(t) and an input value IN(t), wherein IN(t) is the state variable s(t) that is output by the accumulation block 201. The input signal x(t) of the apparatus 400 is weighted using the second adaptation block 401.

The second adaptation block 401 comprises an adder circuit 405 and activation circuit 415. The second adaptation block 401 may be configured to output at the branching point 407, the computed state variable r(t) to the activation circuit 415. The connection 409 between the branching point 407 and the adder circuit 405 is shown as a dashed line to indicate that the connection 409 is with a time-lag. That is, at the time the neuromorphic neuron apparatus 400 is processing a received signal x(t) to generate corresponding r(t), b(t), s(t) and y(t), the connection 409 may transmit a value of a previous state variable r(t−1).

The connection 420 is shown as a dashed line to indicate that the connection 420 is with a time-lag. That is, at the time the neuromorphic neuron apparatus 400 is processing a received signal x(t) to generate corresponding r(t), b(t), s(t) and y(t), the connection 420 may transmit a previous output value y(t−1).

The output value y(t−1) and the state variable r(t−1) of a previous iteration may be fed to the adder circuit 405. The adder circuit 405 may be configured to receive the output value y(t−1) from the output generation block 103 and the state variable r(t−1). The adder circuit 405 may further be configured to perform the sum of the output value y(t−1) and the state variable r(t−1) and the resulting sum r(t) may be output, where r(t)=ρ(τ) r(t−1)+(1−ρ(τ)) y(t−1) and ρ(τ) is the decay factor calculated from the time constant of the second adaptation block.

The activation circuit 415 may be configured to receive the state variable r(t) and to generate from the state variable r(t) an output value z(t) using its activation function h. The output value z(t) may be provided to a reset module 427. The reset module 427 may be configured to generate a reset signal from the received output value z(t) and provide the reset signal to the multiplication circuits 211 and 410. The multiplication circuit 410 may be configured to receive the output value 1−z(t) from the reset module 427 and the signal x(t) and to perform the multiplication of x(t) and 1−z(t). This may enable to obtain s(t) of the accumulation block as follows: s(t)=g(x(t)(1−z(t))+l(τ)s(t−1)(1−z(t))).

Figure 5:
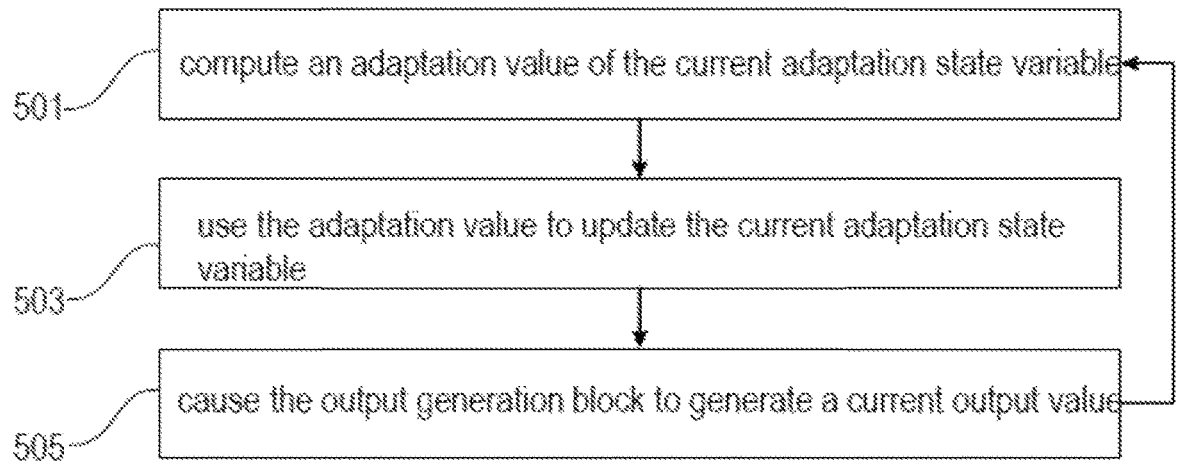
FIG. 5 is a flowchart of a method for generating an output value by a neuromorphic neuron apparatus, according to at least one embodiment.

FIG. 5 is a flowchart of a method for generating an output value by a neuromorphic neuron apparatus comprising an adaptation block and an output generation block. The neuromorphic neuron apparatus has an adaptation state variable b(0) of the adaptation block and output value y(0) of the output generation block that are initialized to respective predefined values (e.g. b(0)=0 and y(0)=0). For example, before receiving and processing any signals, the neuromorphic neuron apparatus may have an initial configuration that has initial values b(0) and y(0).

In step 501, the adaptation block may compute an adaptation value of its current adaptation state variable b(0) using the current output value y(0) and a correction function ρ(τ) indicative of a decay behavior of a time constant of the adaptation block. For example, the adaptation value may be computed as follows: ρ(τ)b(0)+(1−ρ(τ))y(0).

In step 503, the adaptation block may use the adaptation value as an update of the current adaptation state variable b(0). The updated adaptation state variable which is the adaptation value becomes the current adaptation state variable b(1). For example the updated adaptation state variable b(1) may be obtained as follows: b(1)=ρ(τ)b(0)+(1−ρ(τ))y(0), where the computed adaptation value is ρ(τ)b(0)+(1−ρ(τ))y(0).

In step 505, the adaptation block may cause the output generation block to generate a current output value y(1) based on the current adaption state variable b(1) and an input value IN(1). In this example, the input value IN(1) may be a received signal x(1) e.g. by receiving by the output generation block the output of the adaptation block (e.g. after being pre-processed at the adder circuit 111), this may cause the output generation block to perform the computation of y(1) e.g. as described with reference to FIGS. 2-4. In one example, the output value may be computed as follows: y(1)=h(x(1)+βb(1)+b$_0$), where h is the activation function of the output generation block.

Steps 501-505 may be repeated for each received subsequent signal x(t). For example, in a first iteration used for processing a subsequent signal x(2), the values b(1) and y(1) may be the current values of the adaptation state variable and the output variable respectively. In a second iteration used for processing a subsequent signal x(3), the values b(2) and y(2) may be the current values of the adaptation state variable and the output and so on.

Figure 6:
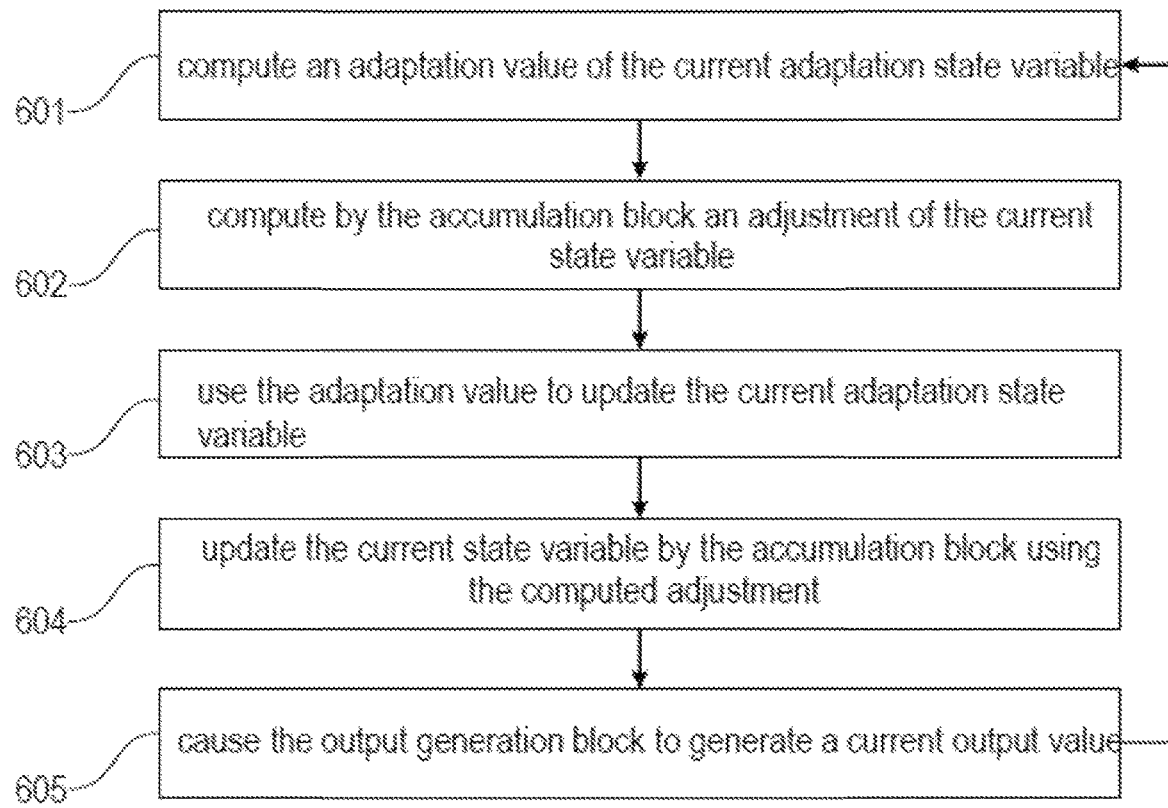
FIG. 6 is a flowchart of a method for generating an output value by a neuromorphic neuron apparatus, according to at least one embodiment.

FIG. 6 is a flowchart of a method for generating an output value by a neuromorphic neuron apparatus comprising an adaptation block, an accumulation block and an output generation block. The neuromorphic neuron apparatus has an adaptation state variable b(0) of the adaptation block, an accumulation state variable s(0) of the accumulation block and output value y(0) of the output generation block that are initialized to respective predefined values (e.g. b(0)=0, s(0)=0 and y(0)=0). For example, before receiving and processing any signals, the neuromorphic neuron apparatus may have an initial configuration that has initial values b(0), s(0) and y(0).

In step 601, the adaptation block may compute an adaptation value of its current adaptation state variable b(0) using the current output value y(0) and a correction function ρ(τ) indicative of a decay behavior of a time constant of the adaptation block. For example, the adaptation value may be computed as follows: ρ(τ)b(0)+(1−ρ(τ))y(0).

The accumulation block may compute in step 602, an adjustment of the current state variable s(0) using the current output value y(0) and a correction function l(τ) indicative of a decay behavior of a time constant of the accumulation block. For example, the adjustment may be computed as follows: l(τ)s(0)(1−y(0)).

In step 603, the adaptation block may use the adaptation value to update the current adaptation state variable b(0). The updated adaptation state variable which is the adaptation value becomes the current adaptation state variable b(1). For example the updated adaptation state variable b(1) may be obtained as follows: b(1)=ρ(τ)b(0)+(1−ρ(τ))y(0), where ρ(τ)b(0)+(1−ρ(τ))y(0) is the computed adaptation value.

In step 604, the current state variable s(0) may be updated by the accumulation block using the computed adjustment and a received signal x(1). For example, the updated value s(1) may be obtained as follows: s(1)=g(x(1)+l(t) s(0) (1−y(0))). And, s(1) becomes, thus, the current state variable.

In step 605, the adaptation block may cause the output generation block to generate a current output value y(1) based on the current adaption state variable b(1) and an input value IN(1). In this example, the input value IN(1) may be the updated accumulation state value s(1) e.g. by receiving by the output generation block the output of the adaptation block (e.g. after being pre-processed at the adder circuit 111), this may cause the output generation block to perform the computation of y(1) e.g. as described with reference to FIGS. 2-4. In one example, the output value may be computed as follows: y(1)=h(s(1)+βb(1)+b$_0$), where h is the activation function of the output generation block.

Steps 601-605 may be repeated for each received subsequent signal x(t). For example, in a first iteration used for processing a subsequent signal x(2), the values b(1), s(1) and y(1) may be the current values of the adaptation state variable, the accumulation state variable and the output variable respectively. In a second iteration used for processing a subsequent signal x(3), the values b(2), s(2) and y(2) may be the current values of the adaptation state variable, the accumulation state variable and the output variable respectively and so on.

Figure 7:
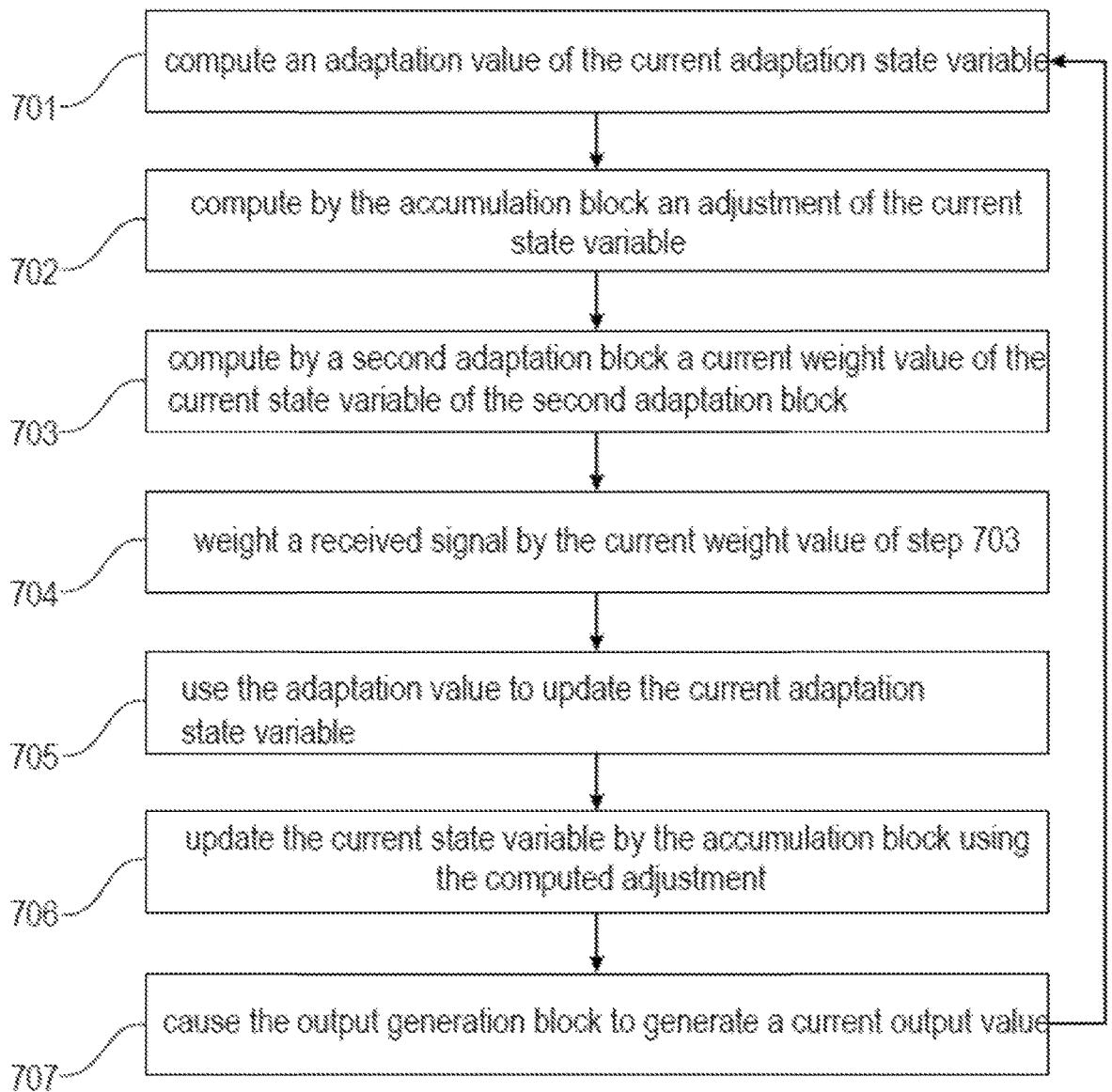
FIG. 7 is a flowchart of a method for generating an output value by a neuromorphic neuron apparatus, according to at least one embodiment.

FIG. 7 is a flowchart of a method for generating an output value by a neuromorphic neuron apparatus comprising two adaptation blocks, an accumulation block and an output generation block. The neuromorphic neuron apparatus has an adaptation state variable b(0) of a first adaptation block of the two adaptation blocks, an adaptation state variable r(0) of a second adaptation block of the two adaptation blocks, an accumulation state variable s(0) of the accumulation block and output value y(0) of the output generation block that are initialized to respective predefined values (e.g. b(0)=0, r(0)=0, s(0)=0 and y(0)=0). For example, before receiving and processing any signals, the neuromorphic neuron apparatus may have an initial configuration that has initial values b(0), r(0), s(0) and y(0).

In step 701, the first adaptation block may compute an adaptation value of its current adaptation state variable b(0) using the current output value y(0) and a correction function ρ(τ) indicative of a decay behavior of a time constant of the adaptation block. For example, the adaptation value may be computed as follows: ρ(τ)b(0)+(1−ρ(τ))y(0).

The accumulation block may compute in step 702, an adjustment of the current state variable s(0) using the current output value y(0) and a correction function l(τ) indicative of a decay behavior of a time constant of the accumulation block. For example, the adjustment may be computed as follows: l(τ)s(0)(1−y(0)).

The second adaptation block may compute in step 703 a current weight value z(1) of the current state variable r(1) of the second adaptation block using the current output value y(0) and a correction function $\rho(\tau)$ indicative of a decay behavior of the time constant of the second adaptation block as follows: $z(1)=h(r(1)+b_r)$, where $r(1)=\rho(\tau)r(0)+(1-\rho(\tau))y(0)$.

A received signal x(1) may be weighted by the computed value z(1) in step 704. The weighted received signal may be the current signal to be used by the accumulation block. In another example, both the received signal x(1) and the current state variable s(0) may be weighted by (1−z(1)) and resulting weighted received signal may be the current signal to be used by the accumulation block and the weighted current state variable s(0) may be the current state variable to be used by the accumulation block.

In step 705, the first adaptation block may use the adaptation value to update the current adaptation state variable b(0). The updated adaptation state variable which is the adaptation value becomes the current adaptation state variable b(1). For example the updated adaptation state variable b(1) may be obtained as follows: $b(1)=\rho(\tau)b(0)+(1-\rho(\tau))y(0)$, where $\rho(\tau)b(0)+(1-\rho(\tau))y(0)$ is the computed adaptation value.

In step 706, the current state variable s(0) may be updated by the accumulation block using the computed adjustment and the weighted received signal z(1)x(1). For example, the updated value s(1) may be obtained as follows: $s(1)=g(z(1)x(1)+l(\tau)s(0)(1-y(0)))$. And, s(1) becomes, thus, the current accumulation state variable. The correction function $\rho(\tau)$ of the first and the correction function $\rho(\tau)$ second adaptation blocks may or may not be the same.

In step 707, the first adaptation block may cause the output generation block to generate a current output value y(1) based on the current adaption state variable b(1) and an input value IN(1). In this example, the input value IN(1) may be the updated accumulation state value s(1) e.g. by receiving by the output generation block the output of the adaption block (e.g. after being pre-processed at the adder circuit 111), this may cause the output generation block to perform the computation of y(1) e.g. as described with reference to FIGS. 2-4. In one example, the output value may be computed as follows: $y(1)=h(s(1)+\beta b(1)+b_0)$, where h is the activation function of the output generation block.

Steps 701-707 may be repeated for each received subsequent signal x(t). For example, in a first iteration used for processing a subsequent signal x(2), the values b(1), r(1), s(1) and y(1) may be the current values of the adaptation state variable of the first adaptation block, the adaptation state variable of the second adaptation block the accumulation state variable and the output variable respectively. In a second iteration used for processing a subsequent signal x(3), the values b(2), r(2), s(2) and y(2) may be the current values of the adaptation state variable of the first adaptation block, the adaptation state variable of the second adaptation block the accumulation state variable and the output variable and so on.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neuromorphic neuron apparatus comprising:
an output generation block;
a current accumulation block comprising a multiplication circuit; and
a first adaptation block;
wherein the apparatus has a current adaptation state variable corresponding to previously generated one or more signals, the output generation block and is configured to use an activation function for generating a current output value based on the current adaptation state variable, the current output value being output from the neuromorphic neuron apparatus; the first adaptation block being configured to repeatedly:
compute an adaptation value of the current adaptation state variable using the current output value and a correction function indicative of a decay behavior of a time constant of the first adaptation block;
use the adaptation value to update the current adaptation state variable, the updated adaptation state variable becoming the current adaptation state variable;
receive a current signal; and
cause the output generation block to generate the current output value based on the current adaptation state variable and on an input value that is obtained from the received signal; and
wherein the accumulation block has a current accumulation state variable, outputs the current accumulation state variable from the accumulation block towards the output generation block for producing the input value, and is configured in each iteration to:
compute an adjustment of the current accumulation state variable, via the multiplication circuit multiplying the current output value against the current accumulation state variable and against a correction function indicative of a decay behavior of a time constant of the accumulation block; and
in response to receiving the current signal, update the current accumulation state variable using the computed adjustment and the received current signal, the updated accumulation state variable becoming the current accumulation state variable, the input value being a value of the current accumulation state variable.

2. The apparatus of claim 1, further comprising a second adaptation block, wherein the second adaptation block is configured to in each iteration:
compute a current weight value of its current state variable using the current output value and a correction function indicative of a decay behavior of a time constant of the second adaptation block; and weight, before receiving a new current signal, the received current signal and the current accumulation state variable by the current weight value, the weighted received signal becoming the current signal and the weighted current state variable becoming the current accumulation state variable.

3. The apparatus of claim 1, further comprising a second adaptation block, the second adaptation block being configured to in each iteration:

compute a current weight value of the current state variable using the current output value and a correction function indicative of a decay behavior of a time constant of the second adaptation block; and weight, before receiving a new current signal, the received current signal by the current weight value, the weighted received signal becoming the current signal.

4. The apparatus of claim 1, wherein the accumulation block is configured to perform the updating using a second activation function different from the activation function of the output generation block.

5. The apparatus of claim 2, wherein the second adaptation block is configured to compute the current weight value using the activation function which is the same as the activation function of the output generation block.

6. The apparatus of claim 3, wherein the second adaptation block is configured to compute the weight value using a second activation function different from the activation function of the output generation block.

7. The apparatus of claim 1, wherein the accumulation block is configured to receive from the output generation block a reset signal indicative of the current output value used for the computing of the adjustment.

8. The apparatus of claim 1, wherein the output generation block is configured to automatically provide to the accumulation block a reset signal indicative of the current output value used for the computing of the adjustment upon generating the current output value.

9. The apparatus of claim 1, wherein the output generation block is configured to provide a reset signal indicative of the current output value used for the computing of the adjustment via a reset gate connecting the accumulation block and the output generation block.

10. The apparatus of claim 1, wherein the accumulation block further comprises an adder circuit and an activation circuit, the adder circuit being configured to add the adjusted state variable to the received signal, the activation circuit being configured to perform the update using a result of an addition from the adder circuit and to provide the updated state variable to the output generation block.

11. The apparatus of claim 2, wherein the second adaptation block comprises an adder circuit and an activation circuit, the adder circuit being configured to add the current output value to the last computed weight value, the activation circuit being configured to perform the computation of the current weight value using a result of an addition.

12. The apparatus of claim 1, wherein the activation function of the output generation block is a step function.

13. The apparatus of claim 1, wherein the activation function of the output generation block is a sigmoid function or another activation function that is configured to generate an output value of the apparatus.

14. The apparatus of claim 1, wherein the accumulation block is configured to perform the updating using an activation function, the activation function being a rectified linear activation function or another activation function that is configured to perform the update by the accumulation block.

15. A method for generating an output value using a neuromorphic neuron apparatus comprising a first adaptation block, an output generation block, and a current accumulation block comprising a multiplication circuit; the method comprising:

computing, via the first adaptation block, an adaptation value of a current adaptation state variable using a current output value and a correction function indicative of a decay behavior of a time constant of the first adaptation block, the current adaptation state variable corresponding to previously received one or more signals, the current output value being based on the current adaptation state variable and being output from the neuromorphic neuron apparatus;

using, via the first adaptation block, the adaptation value to update the current adaptation state variable, the updated adaptation state variable becoming the current adaptation state variable and the updated adaptation state variable being the adaptation value;

receiving a current signal;

computing, via the accumulation block, an adjustment of a current accumulation state variable, the computing comprising the multiplication circuit multiplying the current output value against the current accumulation state variable and against a correction function indicative of a decay behavior of a time constant of the accumulation block;

in response to receiving the current signal, updating, via the accumulation block, the current accumulation state variable using the computed adjustment and the received current signal, the updated accumulation state variable becoming the current accumulation state variable;

outputting, via the accumulation block, the current accumulation state variable from the accumulation block towards the output generation block, the current accumulation state variable being used for producing an input value;

using, via the output generation block, an activation function to generate a current output value based on the current adaptation state variable and on the input value; and outputting, via the output generation block, the current output value from the neuromorphic neuron apparatus.

16. The method of claim 15, further comprising:

computing, via a second adaptation block of the neuron neuromorphic apparatus, a current weight value of its current state variable using the current output value and a correction function indicative of a decay behavior of a time constant of the second adaptation block; and weighting, before receiving a new current signal and via the second adaptation block, the received current signal and the current accumulation state variable by the current weight value, the weighted received signal becoming the current signal and the weighted current state variable becoming the current accumulation state variable.

17. The method of claim 15, further comprising:

computing, via a second adaptation block of the neuron neuromorphic apparatus, a current weight value of the current state variable using the current output value and a correction function indicative of a decay behavior of a time constant of the second adaptation block; and weighting, before receiving a new current signal and via the second adaptation block, the received current signal by the current weight value, the weighted received signal becoming the current signal.

18. A computer program product for generating an output value using a neuromorphic neuron apparatus, the computer program product comprising a computer-readable storage medium having program instructions embodied therewith, the program instructions executable by a processor to cause the processor to perform a method comprising:

computing, via a first adaptation block of the neuromorphic neuron apparatus, an adaptation value of a current adaptation state variable using a current output value and a correction function indicative of a decay behavior of a time constant of the first adaptation block, the current adaptation state variable corresponding to previously received one or more signals, the current output value being based on the current adaptation state variable and being output from the neuromorphic neuron apparatus;

using, via the first adaptation block, the adaptation value to update the current adaptation state variable, the updated adaptation state variable becoming the current adaptation state variable and the updated adaptation state variable being the adaptation value;

receiving a current signal;

computing, via an accumulation block of the neuromorphic neuron apparatus, an adjustment of a current accumulation state variable, the computing comprising a multiplication circuit of the accumulation block multiplying the current output value against the current accumulation state variable and against a correction function indicative of a decay behavior of a time constant of the accumulation block;

in response to receiving the current signal, updating, via the accumulation block, the current accumulation state variable using the computed adjustment and the received current signal, the updated accumulation state variable becoming the current accumulation state variable;

outputting, via the accumulation block, the current accumulation state variable from the accumulation block towards an output generation block of the neuromorphic neuron apparatus, the current accumulation state variable being used for producing an input value;

using, via the output generation block, an activation function to generate a current output value based on the current adaptation state variable and on the input value; and outputting, via the output generation block, the current output value from the neuromorphic neuron apparatus.

19. The computer program product of claim 18, wherein the program instructions are further executable by the processor to cause the processor to:

compute, via a second adaptation block of the neuron neuromorphic apparatus, a current weight value of its current state variable using the current output value and a correction function indicative of a decay behavior of a time constant of the second adaptation block; and weight, before receiving a new current signal and via the second adaptation block, the received current signal and the current accumulation state variable by the current weight value, the weighted received signal becoming the current signal and the weighted current state variable becoming the current accumulation state variable.

20. The computer program product of claim 18, wherein the program instructions are further executable by the processor to cause the processor to:

compute, via a second adaptation block of the neuron neuromorphic apparatus, a current weight value of the current state variable using the current output value and a correction function indicative of a decay behavior of a time constant of the second adaptation block; and weigh, before receiving a new current signal and via the second adaptation block, the received current signal by the current weight value, the weighted received signal becoming the current signal.

* * * * *